(12) United States Patent
Panigrahi et al.

(10) Patent No.: US 10,069,929 B2
(45) Date of Patent: Sep. 4, 2018

(54) ESTIMATING CACHE SIZE FOR CACHE ROUTERS IN INFORMATION CENTRIC NETWORKS

(71) Applicant: Tata Consultancy Services Limited, Mumbai (IN)

(72) Inventors: Bighnaraj Panigrahi, Bangalore (IN); Samar Shailendra, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 222 days.

(21) Appl. No.: 15/065,520

(22) Filed: Mar. 9, 2016

(65) Prior Publication Data

US 2016/0360000 A1    Dec. 8, 2016

(30) Foreign Application Priority Data

Jun. 4, 2015    (IN) .......................... 2161/MUM/2015

(51) Int. Cl.
  *H04L 29/08*    (2006.01)
  *G06F 12/08*    (2016.01)
  (Continued)

(52) U.S. Cl.
  CPC ...... *H04L 67/2842* (2013.01); *G06F 12/0871* (2013.01); *G06F 12/0813* (2013.01);
  (Continued)

(58) Field of Classification Search
  CPC .. G06F 12/0813; G06F 12/0871; G06F 12/12; G06F 2212/1024; G06F 2212/154;
  (Continued)

(56) References Cited

U.S. PATENT DOCUMENTS

| 5,452,440 A | * | 9/1995 | Salsburg | ............. | G06F 11/3447 |
| | | | | | 711/133 |
| 6,950,656 B1 | * | 9/2005 | Bahk | ..................... | H04W 36/22 |
| | | | | | 370/331 |

(Continued)

OTHER PUBLICATIONS

Ming, Z, et al., "Age-based Cooperative Caching in Information-Centric Networks", IEEE, 2014 $23^{rd}$ International Conference on Computer Communication and Networks (ICCCCN), 6 pages, (2014).

(Continued)

*Primary Examiner* — Alina A Boutah
(74) *Attorney, Agent, or Firm* — Finnegan, Henderson, Farabow, Garrett & Dunner LLP

(57) ABSTRACT

A technique for estimating cache size for cache routers in information centric networks (ICNs) is disclosed. In an example, an average rate of incoming requests and a probability of occurrence of each request at a cache router in a predefined time interval is determined. Further, a relation between cache hit and cache miss with and without replacement is derived based on the probability of occurrence of each request. Furthermore, an entropy of the requests is computed based on the probability of occurrence of each request. Moreover, a diversity index of the requests is calculated based on the entropy and the average rate of the requests. A cache size for the cache router is then estimated based on a user defined probability of cache hit, the average rate of the requests, the diversity index of the requests and the relation between the cache hit and cache miss with and without replacement.

11 Claims, 5 Drawing Sheets

(51) Int. Cl.
  *G06F 12/12* (2016.01)
  *G06F 12/0871* (2016.01)
  *G06F 12/0813* (2016.01)
(52) U.S. Cl.
  CPC ...... *G06F 12/12* (2013.01); *G06F 2212/1024* (2013.01); *G06F 2212/154* (2013.01); *G06F 2212/314* (2013.01); *G06F 2212/601* (2013.01)
(58) Field of Classification Search
  CPC ......... G06F 2212/314; G06F 2212/601; H04L 67/2842
  See application file for complete search history.

(56) References Cited

U.S. PATENT DOCUMENTS

| | | | |
|---|---|---|---|
| 7,747,662 | B2 | 6/2010 | Vivekanand |
| 2008/0306917 | A1* | 12/2008 | Ishii ................. G06F 17/30132 |
| 2012/0226867 | A1* | 9/2012 | Ismail ................. G06F 12/0811 711/122 |
| 2013/0166668 | A1 | 6/2013 | Byun et al. |
| 2013/0204961 | A1 | 8/2013 | Fliam et al. |
| 2013/0215756 | A1 | 8/2013 | Jeon et al. |
| 2014/0280679 | A1* | 9/2014 | Dey .................... H04L 67/2842 709/213 |
| 2016/0173604 | A1* | 6/2016 | Panigrahi ............ H04L 67/1097 709/216 |
| 2017/0024328 | A1* | 1/2017 | Imai ...................... G06F 12/122 |
| 2017/0068624 | A1* | 3/2017 | Ash ....................... G06F 12/122 |

OTHER PUBLICATIONS

Li, Z. et al., "Time shifted TV in content centric networkds: the case for cooperative in-network caching", IEEE International Conference on Communications, 7 pages, (2011).

* cited by examiner

FIG. 2      ↙ 200

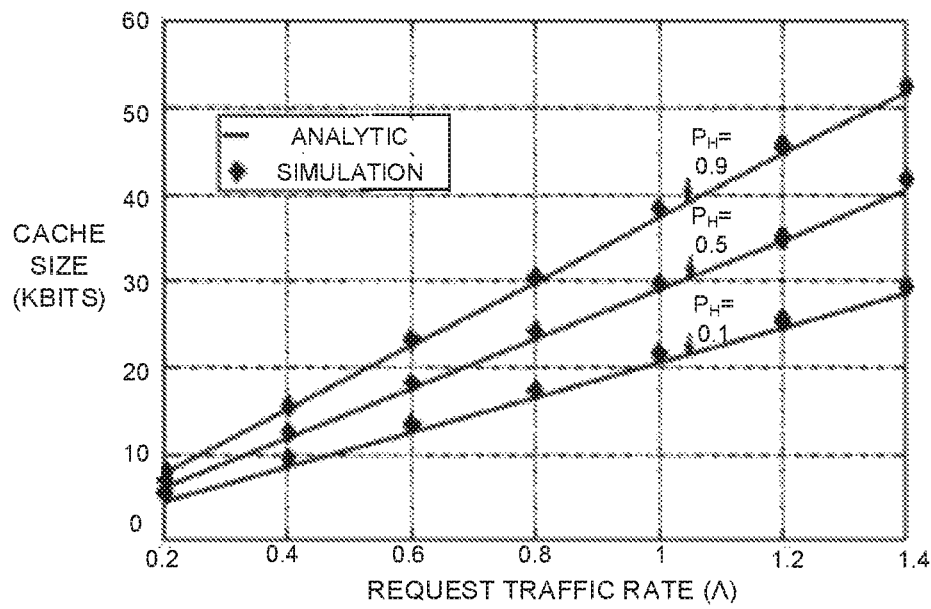
FIG. 4A — 400A
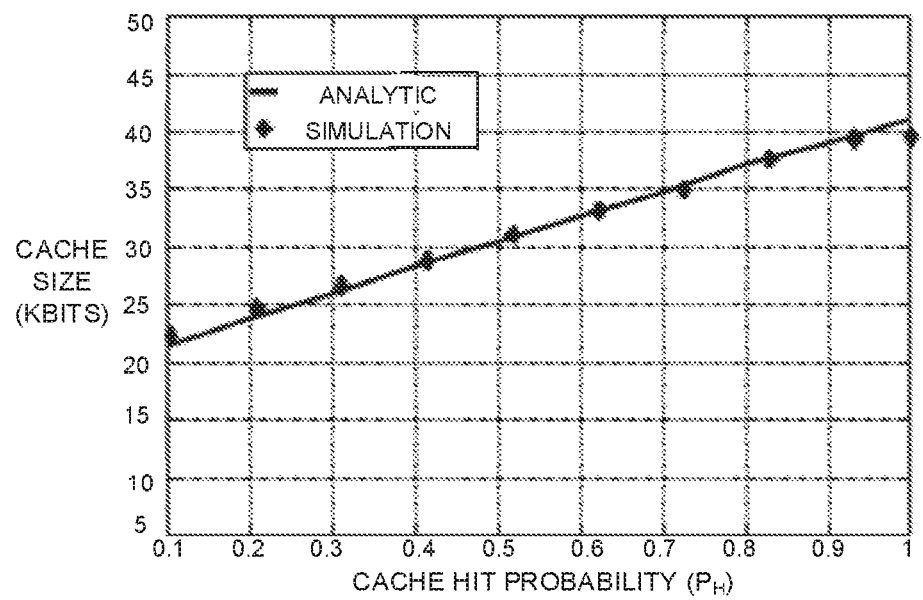
FIG. 4B — 400B

US 10,069,929 B2

ESTIMATING CACHE SIZE FOR CACHE ROUTERS IN INFORMATION CENTRIC NETWORKS

PRIORITY CLAIM

This U.S. patent application claims priority under 35 U.S.C. § 119 to Indian Provisional Application titled "System and method for estimating cache size for cache routers in information centric networks" bearing No. 2161/MUM/2015, filed on Jun. 4, 2015. The entire contents of the aforementioned application are incorporated herein by reference.

TECHNICAL FIELD

The embodiments herein generally relate to information centric networks (ICNs), and, more particularly, to estimation of cache size for cache routers in the ICNs.

BACKGROUND

Currently, the Internet is a point-to-point or host-to-host network where information (also referred as content) is identified by its location in the network. The increasing demand for scalable and efficient distribution of the content led to the Internet architecture, such as information centric networks (ICNs) where communication is not a host-to-host communication. In the ICNs, users may send requests for the content without mentioning its location. Further, in the ICNs, along with a source of the content, the content may cached at intermediate routers to deliver the content to the user(s) either from the source and/or from the routers for any future request of the same content. If a request for the same content is received by such router, the user is served by a local copy of the corresponding content rather than getting it all the way from the source. However, it may not be possible to cache all the content on each intermediate router all the time as each intermediate router include a predefined cache size.

SUMMARY

Embodiments of the present disclosure present technological improvements as solutions to one or more of the above-mentioned technical problems recognized by the inventors in conventional systems. In view of the foregoing, embodiments herein provide a technique for estimating cache size for cache routers in information centric networks (ICNs).

In an embodiment, a method for estimating a cache size for a cache router in an ICN is disclosed. In this embodiment, an average rate of incoming requests and a probability of occurrence of each of the incoming requests at the cache router in a predefined time interval is determined. Further, a relation between a cache hit, cache miss with replacement and cache miss without replacement is derived based on the probability of occurrence of each of the requests. Furthermore, an entropy of the requests is computed based on the probability of occurrence of each of the requests in the predefined time interval. Moreover, a diversity index of the requests is calculated based on the entropy of the requests and the average rate of the requests. The cache size for the cache router is then estimated based on a user defined probability of cache hit, which is an input received from user, the average rate of the requests, the diversity index of the requests and the relation between the cache hit, cache miss with replacement and cache miss without replacement. In some embodiments, the cache size of the cache router is then adjusted depending on a pattern of a new incoming request and the user defined probability of cache hit.

In another embodiment, a cache router in an ICN is disclosed. In this embodiment, the cache router includes one or more processors and a memory and a cache communicatively coupled to the processors, Further, the memory includes a cache size estimation module. In an embodiment, the cache size estimation module determines an average rate of incoming requests and a probability of occurrence of each of the incoming requests in a predefined time interval. Further, the cache size estimation module derives a relation between a cache hit, cache miss with replacement and cache miss without replacement based on the probability of occurrence of each of the requests. Furthermore, the cache size estimation module computes an entropy of the requests based on the probability of occurrence of each of the requests in the predefined time interval. Moreover, the cache size estimation module calculates a diversity index of the requests based on the entropy of the requests and the average rate of the requests. The cache size estimation module then estimates a cache size for the cache router based on a user defined probability of cache hit, which is an input received from user, the average rate of the requests, the diversity index of the requests and the relation between the cache hit, cache miss with replacement and cache miss without replacement. In some embodiments, the cache size estimation module then adjusts the cache size of the cache router depending on a pattern of a new incoming request and the user defined probability of cache hit.

In yet another embodiment, a non-transitory computer readable medium embodying a program executable in a computing device is disclosed. In this embodiment, the program includes a program code for determining an average rate of incoming requests and a probability of occurrence of each of the incoming requests at a cache router in a predefined time interval. Further, the program includes a program code for deriving a relation between a cache hit, cache miss with replacement and cache miss without replacement in the predefined time interval based on the probability of occurrence of each of the incoming requests. Furthermore, the program includes a program code for computing an entropy of the requests based on the probability of occurrence of each of the requests in the predefined time interval. Moreover, the program includes a program code for calculating a diversity index of the requests based on the entropy of the requests and the average rate of the requests. Also, the program includes a program code for estimating a cache size for the cache router based on a user defined probability of cache hit, the average rate of the requests, the diversity index and the relation between the cache hit, cache miss with replacement and cache miss without replacement.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A and 4B are graphs illustrating a cache size of a cache router with respect to a request traffic rate and a probability of cache hit, respectively, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
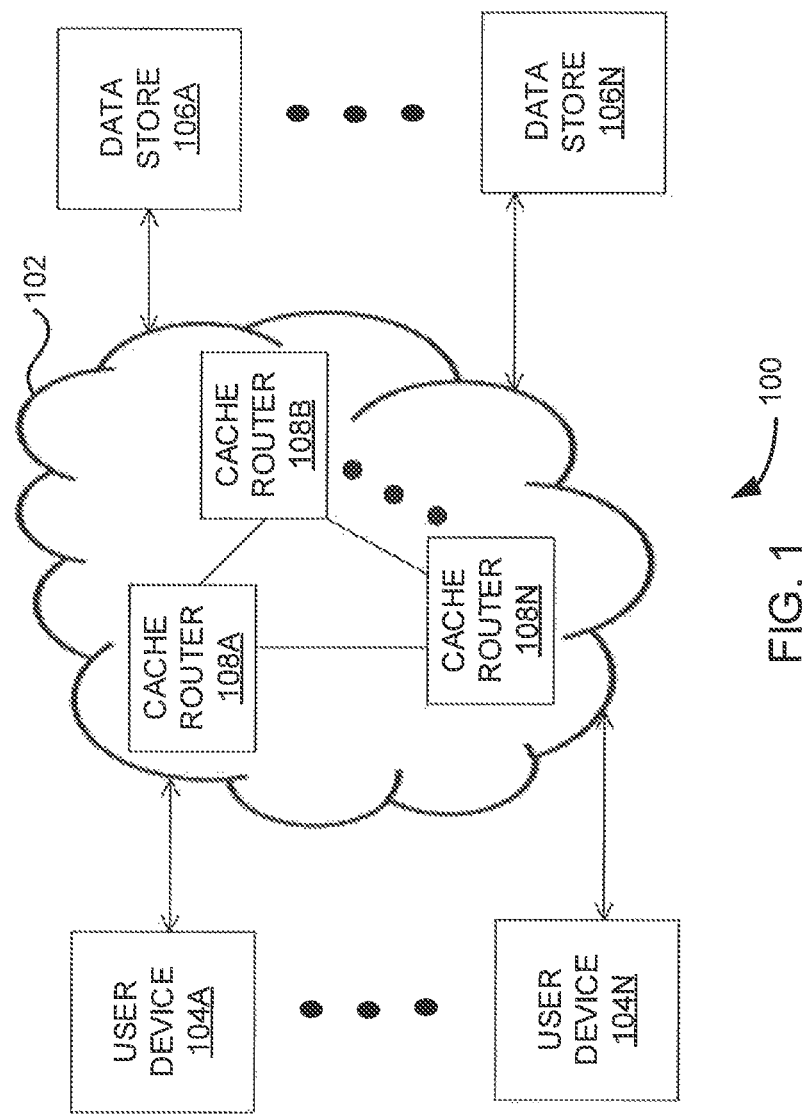
FIG. 1 illustrates a networking environment including an information centric network (ICN), according to some embodiments of the present disclosure.

FIG. 1 illustrates a networking environment 100 including an information centric network (ICN) 102, according to some embodiments of the present disclosure. As shown in FIG. 1, the networking environment 100 includes the ICN 102, a plurality of user devices 104A-N, and a plurality of data stores 106A-N. Examples of the user devices 104A-N may include, without limitation, desktop computers, handheld devices, laptops or other portable computers, network computers, mobile phones, landline phones, and the like. For example, the data stores 106A-N may store collection of content, such as files, images, videos, and the like. Further, the ICN 102 includes a plurality of cache routers 108A-N collectively referred to as cache routers 108 and individually referred to as a cache router 108. In the ICN 102, the cache routers 108 (also referred as ICN routers 108) have extra cache memories (also referred as cache) to locally store contents that pass through the cache routers 108. For example, an ICN router 108 can be any Internet router with extra cache and ICN specific interfaces.

In operation, one or more of the user devices 104A-N may send requests to the ICN 102 for accessing content. In an embodiment, one of the ICN routers 108 may receive the requests and communicate with the data stores 106A-N to provide the content to the one or more of the user devices 104A-N. For example, any intermediate cache router 108 on receiving the requests for the content performs one of the following: (i) serves the requests immediately, if the requested content is available with the cache router 108 and (ii) forwards the request(s) to a peer router or to any other ICN router placed at a higher level of hierarchy, if the requested content in not available in the cache router 108. While performing one of the above steps, the cache router 108 may also store responses of the earlier requests in the cache for any subsequent requests of the same content.

Further, using a tri-state model (also referred as a tri-state Markov model), the ICN router 108 determines a probability of cache hit or cache miss i.e., the probability of finding the content in the cache for newly arriving requests. For example, the cache hit is a function of an available cache size, statistical nature of the requests, and content that is already cached in the cache router. Furthermore, the ICN router 108 determines a relation between a cache hit, cache miss with replacement and cache miss without replacement based on the probability of cache hit or cache miss. Moreover, the ICN router 108 computes an entropy of the requests using the probability of cache hit or cache miss to characterize the requests. In addition, the ICN router 108 calculates a diversity index of the requests based on the entropy of the requests and an average rate of the incoming requests. Also, the ICN router 108 estimates the cache size for the cache based on the average rate of the requests, the diversity index, the relation between the cache hit, cache miss with replacement and cache miss without replacement and a required cache hit probability (i.e., a user defined probability of cache hit) as a measure of service level agreement (SLA). This is explained in more detailed with reference to FIGS. 2 and 3.

Figure 2:
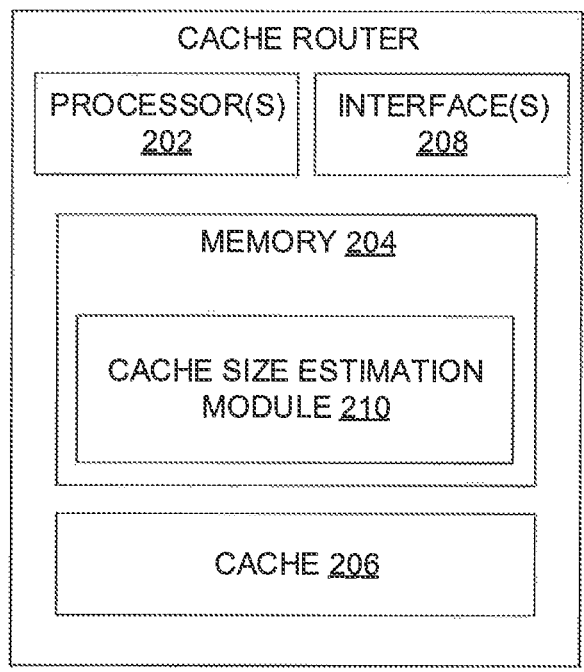
FIG. 2 schematically illustrates a cache router, such as the one shown in FIG. 1, according to some embodiments of the present disclosure.

FIG. 2 schematically illustrates a cache router 200 (e.g., one of the cache routers 108A-N of FIG. 1), according to some embodiments of the present disclosure. As shown in FIG. 2, the cache router 200 includes processor(s) 202, a memory 204, a cache 206 (i.e., a cache memory), and interface(s) 208 communicatively coupled to each other. Further, the memory 204 includes a cache size estimation module 210. The processor(s) 202, the memory 204, the cache 206 and the interface(s) 208 may be communicatively coupled by a system bus or a similar mechanism. Although FIG. 2 shows example components of the cache router 200, in other implementations, the cache router 200 may contain fewer components, additional components, different components, or differently arranged components than depicted in FIG. 2.

The processor(s) 202 may include circuitry implementing, among others, audio and logic functions associated with the communication. The processor(s) 202 may include, among other things, a clock, an arithmetic logic unit (ALU) and logic gates configured to support operation of the processor(s) 202. The processor(s) 202 can be a single processing unit or a number of units, all of which include multiple computing units. The processor(s) 202 may be implemented as one or more hardware processors, microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 204.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 208 may include a variety of software and hardware interfaces, for example, interfaces for peripheral device(s), such as a keyboard, a mouse, an external memory, and a printer. The interface(s) 208 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 208 may include one or more ports for connecting the cache router 200 to one or more of user devices and data sources (as shown in FIG. 1).

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204, may store any number of pieces of information, and data, used by the cache router 200 to implement the functions of the cache router 200. The memory 204 may be configured to store information, data, applications, instructions or the like for enabling the cache router 200 to carry out various functions in accordance with various example embodiments. Additionally or alternatively, the memory 204 may be configured to store instructions which when executed by the processor(s) 202 causes the cache router 200 to behave in a manner as described in various embodiments. The memory 204 includes the cache size estimation module 210 and/or other modules. The module 210 includes routines, programs, objects, components, data structures, etc., which perform particular tasks or implement particular abstract data types. The other modules may include programs or coded instructions that supplement applications and functions of the cache router 200.

In an embodiment, the cache size estimation module 210 computes an average rate of incoming requests and a probability of occurrence of each of the incoming requests from the user devices for a predefined time interval. The data (response) for the requested content is cached at the cache router 200 based upon a caching policy, such as first-in first-out (FIFO), least recently used (LRU) and so on. For example, the predefined time interval is a cache refresh time. Moreover, the cache size estimation module 210 determines a relation between the cache hit and cache miss (with and without replacement) based on the probability of occurrence of the requests in the predefined time interval. For example, the cache hit is a function of an available cache size, statistical nature of the requests, and content that is already cached in the cache router.

The cache size estimation module 210 then computes an entropy of the requests based on the probability of occurrence of the requests in the predefined time interval. Characteristics of the requests are then determined using the entropy of the requests. For example, the characteristics of the requests include content popularity, repetition of content and the like. Furthermore, the cache size estimation module 210 calculates a diversity index of the requests based on the entropy of the requests and the average rate of the requests. This is explained in more detail with reference to FIG. 3. Also, the cache size estimation module 210 estimates the cache size for the cache 206 based upon service level agreement (SLA) or user defined probability of cache hit, the characteristics of the requests (captured through the entropy), the average rate of the requests, the diversity index and the relation between the cache hit and cache miss (with and without replacement). For example, the estimated cache size of the cache router supports the cache hit for the requests and a cache hit for new requests with replacement. In some embodiments, the cache size estimation module 210 adjusts the cache size by observing a request pattern arriving and depending upon the change in traffic pattern and a user defined probability of cache hit.

Figure 3:
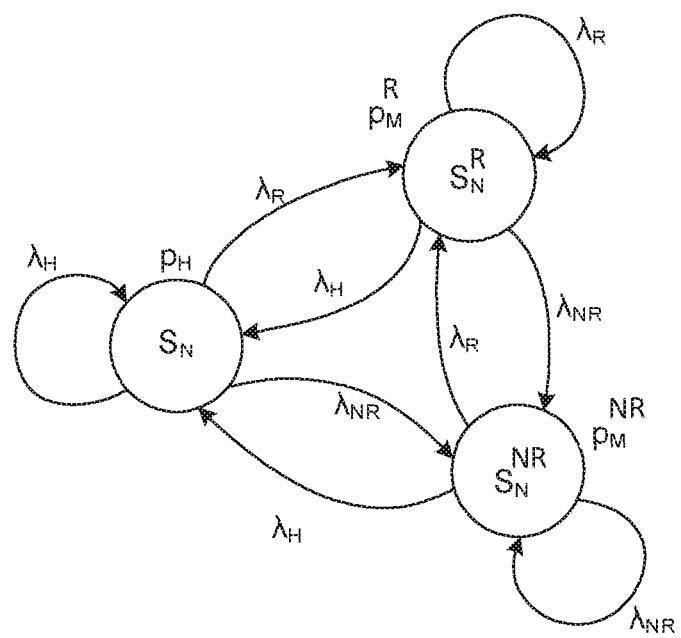
FIG. 3 illustrates a tri-state model for caching content in the ICN, according to some embodiments of the present disclosure.

FIG. 3 illustrates a tri-state model 300 for caching content in the ICN, according to some embodiments of the present disclosure. In FIG. 3, consider Λ is a total arrival rate of requests at an ICN router (e.g., one of the cache routers 108A-N of FIG. 1 or the cache router 200 of FIG. 2). For example, the total arrival rate of requests (Λ) is defined using an equation below:

$$\Lambda = \lambda_H + \lambda_R + \lambda_{NR} \quad (1)$$

where, $\lambda_H$ be a rate of arrival of requests for already existing content in a cache at the ICN router, $\lambda_R$ be a rate of arrival of requests for non-existing content in the ICN router with higher metric than smallest metric content in the cache and hence, replaces existing content and $\lambda_{NR}$ be a rate of arrival of the requests for non-existing content in the cache and are not stored in the cache even after serving to requested users.

Further, the balance equations for the model 300 are as follows:

$$(\lambda_R + \lambda_{NR}) \cdot p_H = \lambda_H \cdot (p_M^R + p_M^{NR}) \quad (2)$$

$$(\lambda_H + \lambda_{NR}) \cdot p_M^R = \lambda_R \cdot (p_H + p_M^{NR}) \quad (3)$$

$$(\lambda_H + \lambda_R) \cdot p_M^{NR} = \lambda_{NR} \cdot (p_H + p_M^R) \quad (4)$$

For the tri-state Markov model explained above, $$p_H + p_M^R + p_M^{NR} = 1 \quad (5)$$

where, $p_H$ is a probability of cache hit, $p_M^R$ is a probability of cache miss with replacement, and $p_M^{NR}$ is a probability of cache miss without replacement.

Also, in FIG. 3, $S_N$, $S_N^R$, and $S_N^{NR}$ are three different possible states of a cache. The cache is in the state $S_N$ when a request for already existing content arrives at the cache. Further, the cache is in the state $S_N^R$ when a request for content which does not exist in the cache arrives, however, the response of such request gets stored in the cache after replacing one of the existing content. Furthermore, the cache is in the state $S_N^{NR}$ when the request for content which does not exist in the cache arrives, however, the response of such request does not replace any existing content in the cache and hence not cached.

Based on the above equations (1)-(5), a relation between the cache hit and cache miss with and without replacement is derived. Further, based on the above equations (1)-(5), it can be observed that with the increase in a size of the cache (B), $\lambda_H$ may increase as $\lambda_H$ is a fraction of the total arrival rate of requests which is getting hit from the cache. Moreover, with a fixed cache size, the possibility of similar requests may increase with that of the total arrival rate of requests. Also, with increase in the total arrival rate of requests, $\lambda_H$ may also increases. Therefore, nature of the requests are analyzed to obtain a proper relationship between B, Λ and $\lambda_H$ as explained below.

A. Characterization of the Requests

In an example, nature of the requests, such as the content popularity or repetition of contents can be characterized using an entropy of the requests as the cache hit depends upon the nature of the requests coming from the user devices. In an example, a time axis in the predefined time interval ($T_f$) is discretized and the entropy of any incoming random request sequence X during the predefined time interval ($T_f$) is computed using an equation:

$$H(X) = \Sigma_i q_i \times \log_2(q_i) \qquad (6)$$

where, $q_i$ is the probability of occurrence of any request 'i' in a set of random requests originating from the user devices within the predefined time interval ($T_f$).

For example, the value of entropy H(X) depends on the request rate Λ (average request rate in $T_f$) and the probability of occurrence of the requests. The entropy H(X) is equal to $\log_2(\Lambda)$ when there is no similarity between the requests. On the other hand, the entropy H(X) is equal to 0 when all the requests are repeated. Thus, the entropy H(X) is a more accurate way of determining popularity or diversity index of the requests. Therefore, a diversity index ($\tau_B$) of the requests is calculated using an equation below:

$$\tau_B = \frac{H(X)}{\log_2(\Lambda)} \qquad (7)$$

where, the diversity index ($\tau_B$) of the requests ranges between 0 and 1. The diversity index of 0 indicates that the requests at the cache router are same and the diversity index of 1 indicates that the requests are different.

B. Estimation of a Cache Size

As discussed above, the cache size for the ICN router can be such that the ICN router is able to accommodate $\lambda_H$ (to support the cache hit for the current requests) and $\lambda_R$ (to support cache hit for new requests by keeping the most valued content for which the requests are arrived in the cache router) fraction of requests in the predefined time interval ($T_f$). For example, the cache size (B) can be estimated using one of the below equations:

$$B = B_{min} + \tau_B(c_1 \lambda_H + c_2 \lambda_R)s \qquad (8)$$
$$= B_{min} + \tau_B \Lambda s(c_1 p_H + c_2 p_M^R)$$
$$= B_{min} + \tau_B \Lambda s(c_1 p_H + c_2(1 - (p_H + p_M^{NR})))$$

where, $c_1$ and $c_2$ are constants ($0 \leq c_1, c_2 \leq 1$ and $c_1 + c_2 = 1$), values of which can be obtained using simulations, $B_{min}$ is a minimum cache size required for the regular operation of the ICN router which includes caching of requests, caching of temporary information and caching for a single content in the case $\tau_B = 0$, i.e., for single repeated request, 's' is an average size of the content associated with the requests at the cache router. Further, $p_H$ is the probability of cache hit to be achieved to support service level agreement (SLA).

In an example, estimation of the cache size for the ICN router is performed using equation (8) where the requests characterization is measured through $\tau_B$, $p_M^{NR}$ and Λ and desired cache hit ($p_H$). With change in requests' arrival rate and pattern in future, the cache size can be adjusted by adding additional memory to the cache as required to support cache hit probability.

C. Analysis and Bounds for Caching

In an example, nature of the caching and the cache size estimation are analyzed by assuming $c_1 = c_2 = c$, a constant (c=0.5), in equation (8). Then, the equation (8) can be expressed as follows:

$$B = B_{min} + \tau_B \Lambda s(c_1 p_H + c_2 p_M^R) \qquad (9)$$
$$= B_{min} + \tau_B \Lambda cs(1 - p_M^{NR})$$

Using (9), the probability of miss $p_M^{NR}$ can be expressed as follows:

$$p_M^R = [1 - B - B_{min}/c\tau_B \Lambda s], \qquad (10)$$
$$= [1 - B_1/c\tau_B \Lambda s],$$

where, $B_1$ is a function of the cache size B. From the above equations, it is observed that cache size is linearly increased (decreased) as the entropy of the requests is increased (decreased) to maintain a desired cache hit or cache miss. Further, the cache size of the ICN router is fixed and bounded for a desired cache hit probability with bounded entropy, $\tau_B$ and fixed average rate of requests.

FIGS. 4A and 4B are graphs 400A and 400B illustrating a cache size of a cache router with respect to a request traffic rate and a probability of cache hit, respectively, according to some embodiments of the present disclosure. In FIG. 4A, the graph 400A shows variation of the cache size with respect to the rate of requests (Λ) for different target cache hit probabilities. From the FIG. 4A, it is observed that as the request rate increases, cache size also increases for a fixed target cache hit probability. This is because as more number of requests arrive, higher cache size is required to maintain a target cache hit probability. In FIG. 4B, the graph 400B shows that the cache size increases with increase in cache hit probability for a fixed request rate. This is because higher the target cache hit probability more is the cache size required.

Figure 5:
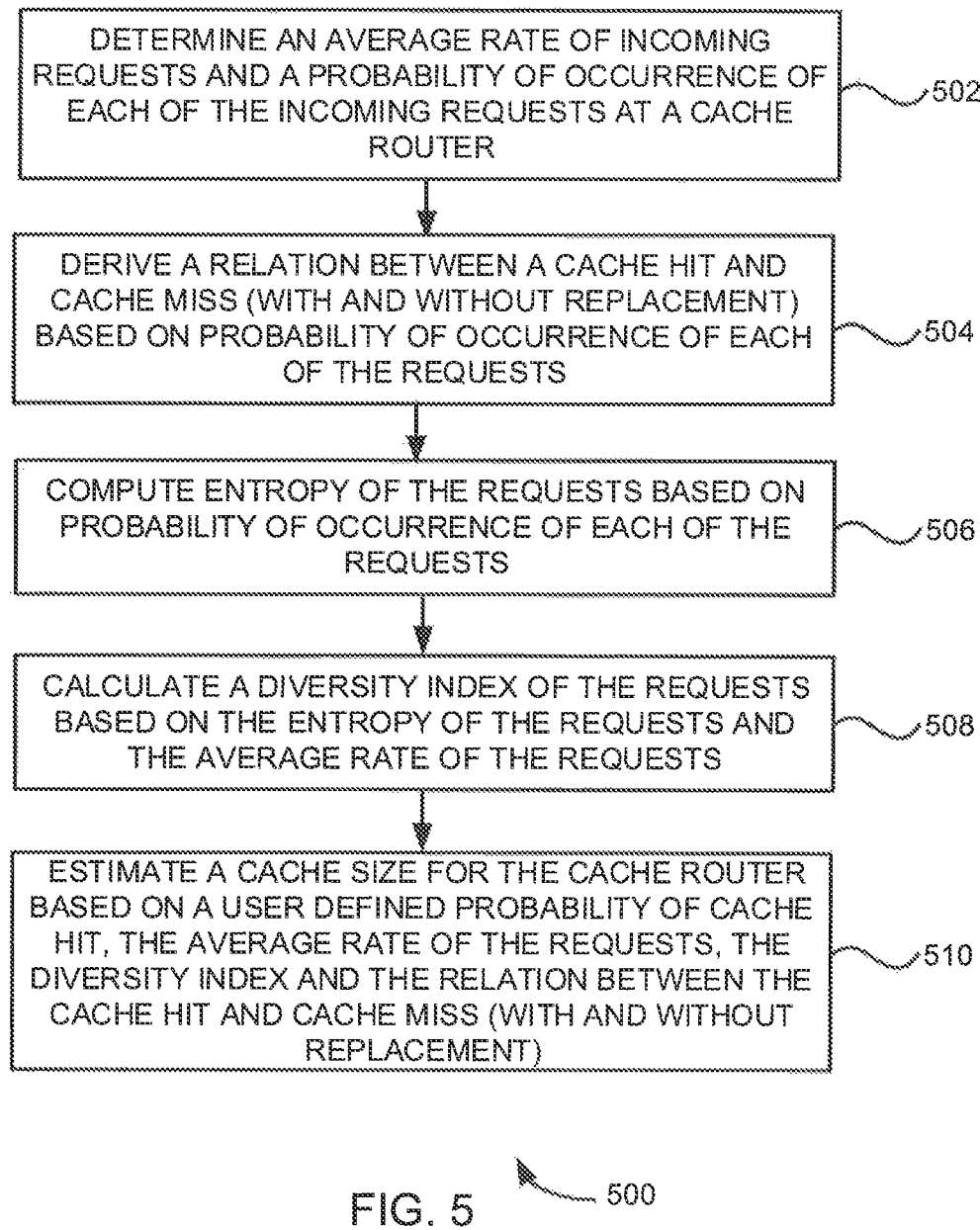
FIG. 5 is a flow chart illustrating a method for estimating a cache size for a cache router in an ICN, according to some embodiments of the present disclosure.

FIG. 5 is a flow chart 500 illustrating a method for estimating a cache size for a cache router in an ICN, according to some embodiments of the present disclosure. At block 502, an average rate of incoming requests and a probability of occurrence of each of the incoming requests at a cache router in a predefined time interval is determined. The data (response) for the requested content is cached at the router based upon a caching policy such as FIFO, LRU and so on. At block 504, a relation between a cache hit, cache miss with replacement and cache miss without replacement is derived based on the probability of occurrence of each of the requests. For example, the cache hit is a function of an available cache size, statistical nature of the requests, and content that is already cached in the cache router. At block 506, an entropy of the requests is computed based on the probability of occurrence of each of the requests in the predefined time interval. In an embodiment, the entropy of the requests is computed using an equation:

$$H(X) = \Sigma_i q_i \times \log_2(q_i)$$

where, X is a sequence of incoming requests during a predefined time interval ($T_f$), H(X) is the entropy of the requests and $q_i$ is a probability of occurrence of a request 'i' in the requests.

At block 508, a diversity index of the requests is calculated based on the entropy of the requests and the average rate of the requests. For example, the diversity index ranges between 0 and 1. The diversity index of 0 indicates that the requests at the cache router e same and the diversity index of 1 indicates that all the requests are different. In an embodiment, the diversity index of the requests is calculated using an equation:

$$\tau_B = \frac{H(X)}{\log_2(\Lambda)}$$

where, $\tau_B$ is the diversity index of the requests and $\Lambda$ is a total arrival rate of requests at the cache router (i.e., the average rate of requests).

At block 510, the cache size for the cache router is estimated based upon a user defined probability of cache hit, the average rate of incoming requests, the diversity index and the relation between the cache hit, cache miss with replacement and cache miss without replacement obtained from blocks 502 to 508. For example, the estimated cache size of the cache router supports the cache hit for the requests and a cache hit for new requests with replacement.

In an example, the cache size for the cache router is estimated using one of equations:

$$B = B_{min} + \tau_B(c_1\lambda_H + c_2\lambda_R)s$$
$$= B_{min} + \tau_B\Lambda s(c_1 p_H + c_2 p_M^R)$$
$$= B_{min} + \tau_B\Lambda s(c_1 p_H + c_2(1 - (p_H + p_M^{NR})))$$

where, B is the cache size, $c_1$ and $c_2$ are constant values, $\lambda_H$ is a rate of arrival of requests for already existing content in the cache router, $\lambda_R$ is a rate of arrival of requests for non-existing content in the cache router with replacement, $B_{min}$ is a minimum cache size required for a regular operation of the cache router (cache required for a single file size to run basic algorithm), 's' is an average size of content associated with the requests at the cache router, $p_H$ is a probability of the cache hit, $p_M^R$ is a probability of the cache miss with replacement, and $p_M^{NR}$ is a probability of the cache miss without replacement.

In some embodiments, the cache size of the cache router is adjusted depending on a pattern of a new incoming request and the user defined probability of cache hit. In other words, the cache size is adjusted by observing a request pattern arriving and depending upon a change in traffic pattern and the user defined probability of cache hit, This is explained in more detailed with reference to the FIGS. 1-4B.

The order in which the method(s) are described is not intended to be construed as a limitation, and any number of the described method blocks can be combined in any order to implement the method 500, or an alternative method. Additionally, individual blocks may be deleted from the methods without departing from the spirit and scope of the subject matter described herein. Furthermore, the method 500 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

In various embodiments of FIGS. 1-5, a technique for estimating a cache size for a cache router in an ICN is disclosed. For a given traffic model, i.e. the diversity index and for a desired probability of cache hit, cache size estimation by the proposed technique can ensure a cache size which is memory efficient and performance efficient. Thus, delay in accessing content is reduced. Further, the proposed technique for cache size estimation can adapt to different types of content traffic, user's requests pattern and desired cache performance of the cache router.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
   determining, by one or more hardware processors, an average rate of incoming requests and a probability of occurrence of each of the incoming requests at a cache router in a predefined time interval;
   deriving, by the one or more hardware processors, a relation between a cache hit, cache miss with replacement and cache miss without replacement in the predefined time interval based on the probability of occurrence of each of the incoming requests;

computing, by the one or more hardware processors, an entropy of the requests based on the probability of occurrence of each of the requests in the predefined time interval;

calculating, by the one or more hardware processors, a diversity index of the requests based on the entropy of the requests and the average rate of the requests;

estimating, by the one or more hardware processors, a cache size for the cache router based on a user defined probability of cache hit, the average rate of the requests, the diversity index and the relation between the cache hit, cache miss with replacement and cache miss without replacement; and adjusting, by the one or more hardware processors, the cache size of the cache router depending on a pattern of a new incoming request and the user defined probability of cache hit.

2. The method of claim 1, wherein the cache hit is a function of an available cache size, statistical nature of the requests, and content that is cached in the cache router.

3. The method of claim 1, wherein the diversity index of the requests ranges between 0 and 1, wherein the diversity index of 0 indicates that the requests at the cache router are same and the diversity index of 1 indicates that the requests at the cache router are different.

4. The method of claim 1, wherein the cache size for the cache router is estimated based on a rate of arrival of requests for existing content in the cache router, a rate of arrival of requests for non-existing content in the cache router with replacement, a minimum cache size required for the cache router, an average size of content associated with the requests at the cache router, a probability of the cache hit, a probability of the cache miss with replacement, a probability of the cache miss without replacement, the diversity index of the requests and the average rate of the requests.

5. The method of claim 1, wherein the estimated cache size of the cache router supports the cache hit for the requests and a cache hit for new requests with replacement.

6. A cache router in an information centric network, comprising:
　at least one processor; and
　a memory and a cache communicatively coupled to the at least processor, wherein the memory comprises a cache size estimation module to:
　　determine an average rate of incoming requests and a probability of occurrence of each of the incoming requests in a predefined time interval;
　　derive a relation between a cache hit, cache miss with replacement and cache miss without replacement based on the probability of occurrence of each of the requests;
　　compute an entropy of the requests based on the probability of occurrence of each of the requests in the predefined time interval;
　　calculate a diversity index of the requests based on the entropy of the requests and the average rate of the requests;
　　estimate a cache size of the cache based on a user defined probability of cache hit, the average rate of the requests, the diversity index and the relation between the cache hit, cache miss with replacement and cache miss without replacement; and
　　adjust the cache size of the cache router depending on a pattern of a new incoming request and the user defined probability of cache hit.

7. The cache router of claim 6, wherein the cache hit is a function of an available cache size, statistical nature of the requests, and content that is cached in the cache.

8. The cache router of claim 6, wherein the diversity index of the requests ranges between 0 and 1, wherein the diversity index of 0 indicates that the requests are same and the diversity index of 1 indicates that all the requests are different.

9. The cache router of claim 6, wherein the cache size estimation module estimates the cache size for the cache based on a rate of arrival of requests for existing content in the cache, a rate of arrival of requests for non-existing content in the cache with replacement, a minimum cache size required for the cache, an average size of content associated with requests, a probability of the cache hit, a probability of the cache miss with replacement, a probability of the cache miss without replacement, the diversity index of the requests and the average rate of the requests.

10. The cache router of claim 6, wherein the estimated cache size of the cache supports the cache hit for the requests and a cache hit for new requests with replacement.

11. A non-transitory computer readable medium embodying a program executable in a computing device, said program comprising:
　a program code for determining an average rate of incoming requests and a probability of occurrence of each of the incoming requests at a cache router in a predefined time interval;
　a program code for deriving a relation between a cache hit, cache miss with replacement and cache miss without replacement in the predefined time interval based on the probability of occurrence of each of the incoming requests;
　a program code for computing an entropy of the requests based on the probability of occurrence of each of the requests in the predefined time interval;
　a program code for calculating a diversity index of the requests based on the entropy of the requests and the average rate of the requests;
　a program code for estimating a cache size for the cache router based on a user defined probability of cache hit, the average rate of the requests, the diversity index and the relation between the cache hit, cache miss with replacement and cache miss without replacement; and
　a program code for adjusting the cache size of the cache router depending on a pattern of a new incoming request and the user defined probability of cache hit.

\* \* \* \* \*